US008981653B2

(12) United States Patent
Trattler et al.

(10) Patent No.: US 8,981,653 B2
(45) Date of Patent: Mar. 17, 2015

(54) FLASH DRIVER TO LIMIT A LOAD CURRENT OF A FLASH AND METHOD TO LIMIT A LOAD CURRENT OF A FLASH DRIVER

(71) Applicant: ams AG, Unterpremstätten (AT)

(72) Inventors: Peter Trattler, Graz (AT); Karl Georg Waser, Graz (AT)

(73) Assignee: ams AG, Unterpremstaetten (AT)

( * ) Notice: Subject to any disclaimer, the term of this patent is extended or adjusted under 35 U.S.C. 154(b) by 193 days.

(21) Appl. No.: 13/840,032

(22) Filed: Mar. 15, 2013

(65) Prior Publication Data

US 2013/0272688 A1    Oct. 17, 2013

(30) Foreign Application Priority Data

Apr. 13, 2012    (EP) ..................... 12164140

(51) Int. Cl.
*H05B 41/00* (2006.01)
*H05B 41/30* (2006.01)
(Continued)

(52) U.S. Cl.
CPC ............ *G03B 15/05* (2013.01); *H05B 33/0815* (2013.01); *H05B 33/0824* (2013.01); *Y02B 20/347* (2013.01)
USPC ............ 315/200 A; 315/241 P; 315/291; 315/307; 315/308; 315/297; 396/206

(58) Field of Classification Search
CPC .. H05B 33/0815; H05B 33/818; H05B 41/32; H05B 37/02; H05B 33/0851; H05B 33/0842; H05B 41/2828; H05B 41/3927; Y02B 20/347; G11C 2029/5004; G11C 2029/5006
USPC .............. 315/241 P, 200 A, 33, 308
See application file for complete search history.

(56) References Cited

U.S. PATENT DOCUMENTS 7,778,055 B2    8/2010    Trattler
7,969,121 B2 *  6/2011    Smith et al. ................... 320/167
(Continued)

FOREIGN PATENT DOCUMENTS

DE    102005012662 A1    9/2006
DE    102005030123 A1    1/2007
(Continued)

*Primary Examiner* — Douglas W Owens
*Assistant Examiner* — Christian L Garcia
(74) *Attorney, Agent, or Firm* — McDermott Will & Emery LLP

(57) ABSTRACT

A flash driver to limit a load current for a flash comprises a dc/dc converter (DCDC) having a first input (IN1) to receive an input voltage (Vin) and an output (OUT) to supply an output voltage (Vout). The dc/dc converter is designed to convert the input voltage (Vin) to the output voltage (Vout). Furthermore the flash driver has an adjustable current source (Iadj) connected between the output (OUT) and a load terminal (LT). A first control unit (CTRL_1) is connected to the first input (IN1) and coupled to the adjustable current source (Iadj), and is designed to compare the input voltage (Vin) to a threshold (Vth) and, if the comparison indicates the input voltage (Vin) being smaller than the threshold value (Vth), adjust the adjustable current source (Iadj) such that the input voltage (Vin) is equal or greater than the threshold value (Vth). A second control unit (CTRL_2) is coupled to the adjustable current source (Iadj) and the dc/dc converter (DCDC) and is designed to detect a voltage drop over the adjustable current source (Iadj) and to set the dc/dc converter (DCDC) to control the conversion of input voltage (Vin) to the output voltage (Vout) depending on the detected voltage drop.

16 Claims, 4 Drawing Sheets

Figure 1:
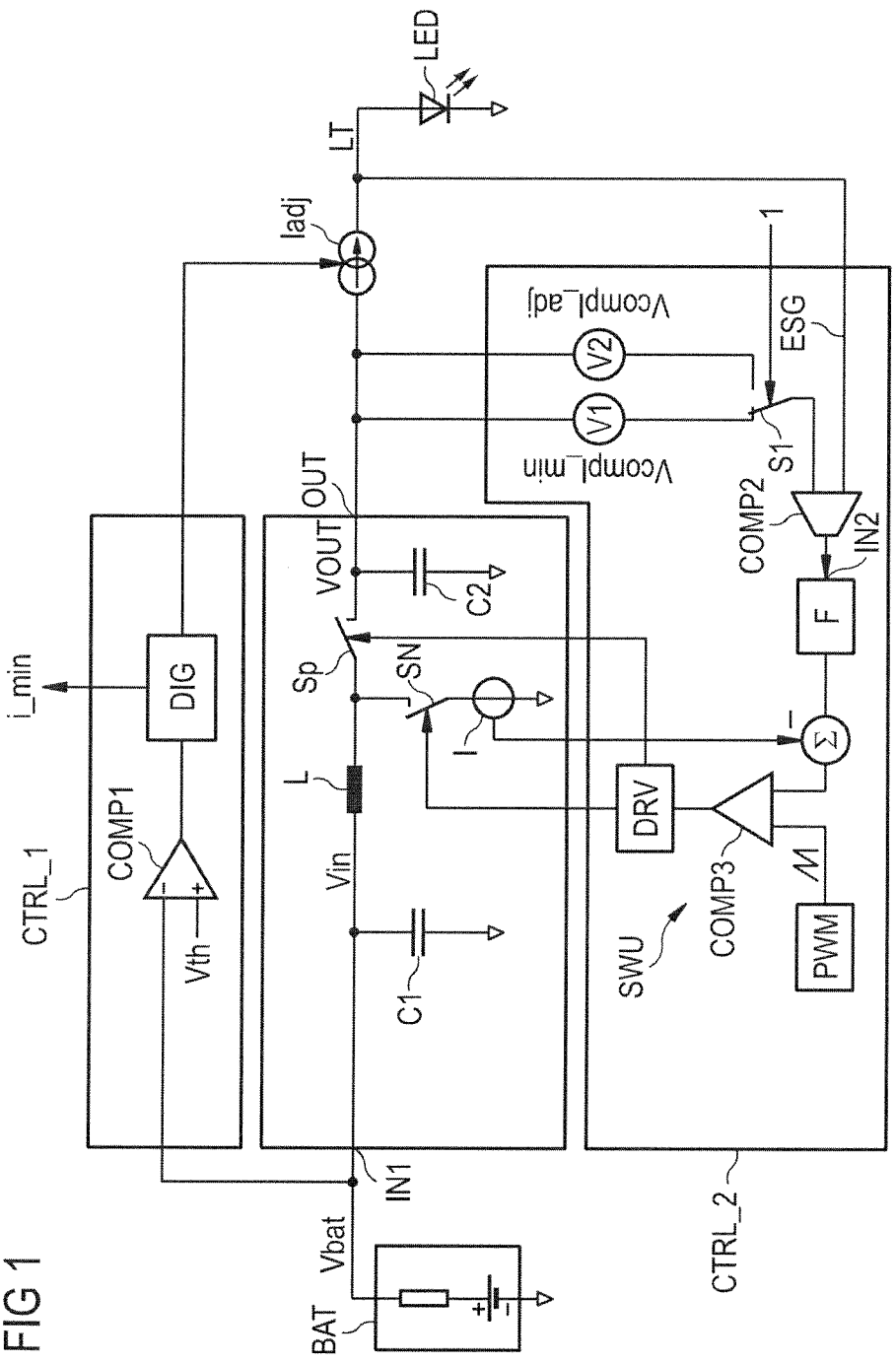

(51) Int. Cl.
*H05B 41/16* (2006.01)
*H05B 41/36* (2006.01)
*G05F 1/00* (2006.01)
*G03B 7/26* (2006.01)
*G03B 15/05* (2006.01)
*H05B 33/08* (2006.01)

(56) References Cited

U.S. PATENT DOCUMENTS

| | | | |
|---|---|---|---|
| 7,990,074 B2 * | 8/2011 | Sandner et al. | 315/291 |
| 8,779,677 B2 * | 7/2014 | Trattler | 315/240 |
| 2005/0231127 A1 | 10/2005 | Yamamoto et al. | |
| 2006/0220570 A1 | 10/2006 | Evans et al. | |
| 2009/0085502 A1 * | 4/2009 | Geris et al. | 315/308 |
| 2009/0167260 A1 | 7/2009 | Pauritsch et al. | |
| 2010/0213842 A1 * | 8/2010 | Geris | 315/33 |
| 2013/0181523 A1 * | 7/2013 | Zhang et al. | 307/35 |
| 2013/0241442 A1 * | 9/2013 | Trattler | 315/307 |

FOREIGN PATENT DOCUMENTS

| | | |
|---|---|---|
| DE | 102007054253 B3 | 7/2009 |
| DE | 102010047157 A1 | 4/2012 |
| WO | 2011/135505 A1 | 11/2011 |
| WO | 2012/041985 A1 | 4/2012 |

* cited by examiner

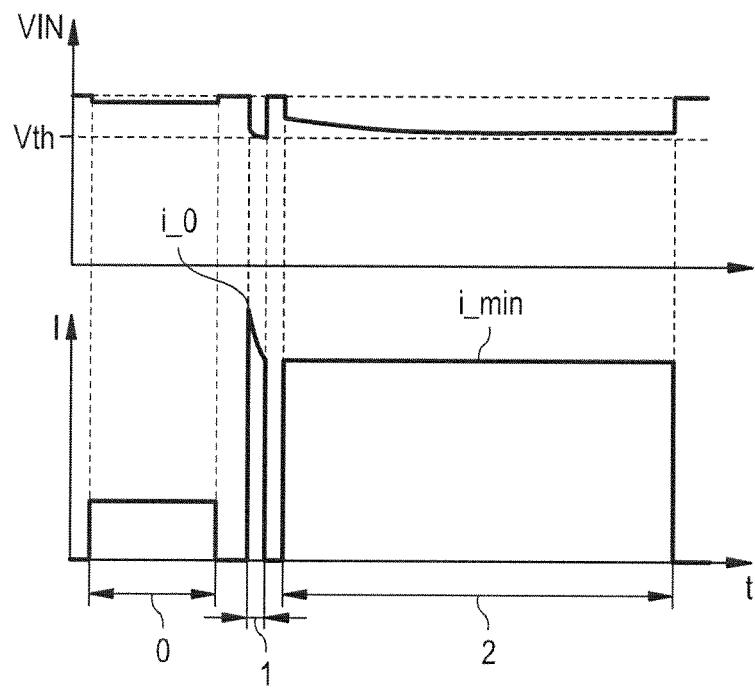
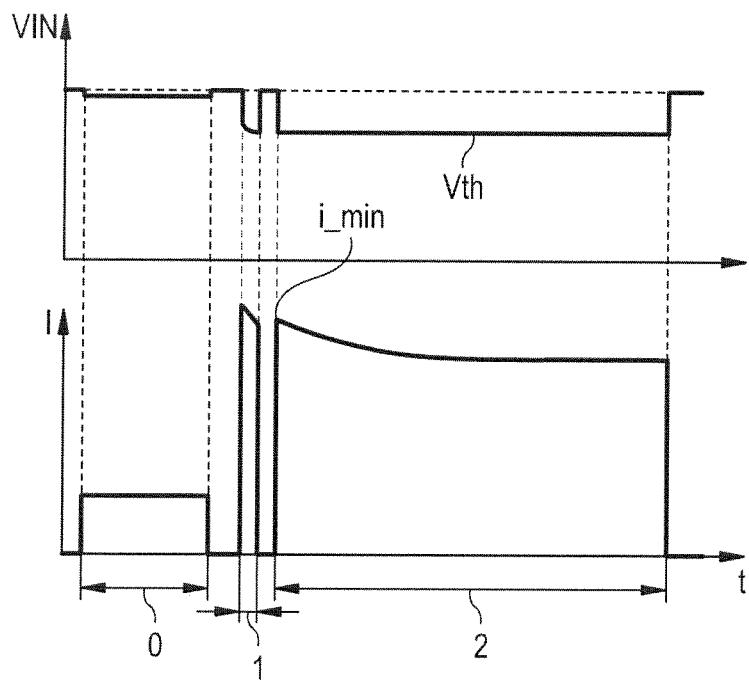

FLASH DRIVER TO LIMIT A LOAD CURRENT OF A FLASH AND METHOD TO LIMIT A LOAD CURRENT OF A FLASH DRIVER

This invention relates to a flash driver to limit a load current of a flash as well as to a method to limit a load current of a flash driver.

An ever increasing number of mobile devices are equipped with cameras. Frequently, however, ambient light conditions require some sort of flash to provide sufficient illumination. Current mobile devices are regularly prepared with dedicated light sources and driver circuits which offer decent flash capabilities. These systems, however, share the same battery supply limitation. A great number of subsystems are integrated into the mobile devices each adding additional load to the battery. Usually not all subsystems are active but may be activated on occasion, e.g. an incoming call may activate a RF module. The corresponding high power load might cause the system to collapse or to reset as the battery might enter a critical state.

Different systems have been proposed to evaluate battery conditions and implement means to prevent or indicate possible failure of the devices. Some of these systems test conditions under which a certain functionality of the mobile device can be maintained. One example is to use a diagnostic flash in order to determine appropriate parameters before executing a main flash. One difficulty lies in accurate prediction of the influence of temperature rise to be expected during the main flash. The flash current might not be constant due to heating of the device. In fact, internal heating reduces the efficiency of the flash driver. During a diagnostic flash, the system is evaluated with a cold device and parameters are set to fit to this condition. During the often longer main flash phase the device heats up and may have to reduce its output current as battery current cannot be increased due to battery limitation.

It is an object of the present invention to provide a flash driver as well as a method for a flash driver in which a load current can be better regulated under changing temperature conditions.

This object is solved by the subject-matter of the independent claims. Preferred embodiments are presented in dependent claims.

According to an aspect of the invention, a flash driver to limit a load current for a flash comprises a dc/dc converter having a first input to receive an input voltage and an output to supply an output voltage. Furthermore, the flash driver comprises an adjustable current source connected between the output and a load terminal. Load can be connected to the load terminal. For example, a light emitting diode or other loads may be connected between the load terminal and ground potential. The adjustable current source may also be connected to the load terminal and ground potential with the load connected between the output and load terminal. A first control unit is connected to the first input and coupled to the adjustable current source. A second control unit is coupled to the adjustable current source on one side and the dc/dc converter on the other side.

In operation, the first input of a flash driver is connected to a battery or accumulator. The battery provides the input voltage which is converted to the output voltage by means of the dc/dc converter. The conversion depends on several parameters to be discussed in the following.

First, the first control unit monitors the input voltage by comparing the input voltage to a threshold value. If that comparison indicates that the input voltage is smaller than the threshold value the first control unit adjusts the adjustable current source so that the input voltage Vin is set equal or greater than the threshold value. As the connected battery provides the input voltage, applying load to the flash driver results in a voltage drop in the input voltage. By adjusting the adjustable current source the desired voltage condition, i.e. input voltage equal or greater than the threshold value can be re-established.

Second, the second control unit comprises means to detect a voltage drop over the adjustable current source. This detected voltage is used to set the dc/dc converter to control the conversion of the input voltage to the output voltage depending on the detected voltage drop. Preferably the voltage conversion of the dc/dc converter is set so as to keep constant the current adjusted at the adjustable current source.

An advantage of the above-described flash driver arrangement lies in the fact that the output current at the load terminal can be kept constant even under varying temperature conditions. Preferably, the measured voltage drop is used to set the dc/dc converter so as to keep the output current constant. This allows for compensating temperature changes. The current to be supplied at the load terminal may, without the suggested precautions, not be constant and generally depends on the temperature of the flash driver. Temperature may change due to heating of the device during operation. In fact, internal heating of the device may reduce the efficiency of the flash driver. As the battery current cannot be increased due to its safety limitation and/or charge condition, the flash driver is forced to reduce its output current as a function of temperature if no further control was implemented. The suggested implementation, however, allows for accurate evaluation of battery conditions to provide constant current throughout the operation of the flash driver. Quality of a flash to be used with the flash driver can be improved as lighting conditions can also be constant during the flash.

According to another aspect of the invention the second control unit has means to determine a compliance voltage of the adjustable current source from the detected voltage drop. A current source has a defined minimum voltage required to guarantee to supply an output current of a given size. This characteristic voltage is called a compliance voltage. The compliance voltage can be derived from the voltage drop over the adjustable current source and provides a regulation control variable which can be used to assure a constant current can be supplied during operation of the flash driver.

The compliance voltage of the adjustable current source can depend on the current set. Therefore it either has to be measured by detecting the voltage drop over the adjustable current source. Or the compliance voltage could also be set to an appropriate value. This way control of the dc/dc converter is largely independent on temperature changes as the compliance voltage is taken into account and used to set the conversion of input to out voltage at the dc/dc converter.

According to another aspect of the invention, the first control unit comprises a comparator connected on its input side with the first input and a reference input to apply the threshold value. The comparator is, on its output side, connected to a digital controller. The digital controller is coupled to the adjustable current source.

The comparator compares the input voltage, which depends on the load applied to the flash driver and the charge condition of the battery, to the threshold value. Depending on that comparison, the digital controller activates appropriate means to adjust the adjustable current source. The current provided by the adjustable current source can generally be increased or decreased such that the input voltage is again equal or greater than the threshold value. It is preferred, however, that adjusting the adjustable is done by reducing the current as a function of loads applied.

According to another aspect of the invention, the first control unit comprises an interface to receive data signals indicating the flash driver to enter a diagnostic flash phase or a main flash phase. The interface can be designed to receive data signals from an external entity such as a camera processor or other processing means. It can also be an internal interface such that the first control unit itself provides appropriate data signals.

Preferably, the diagnostic flash phase is used to evaluate how to set system parameters to allow for use of a flash during the main flash phase given the current battery conditions. Usually the diagnostic flash phase is set to be shorter in time than the subsequent main flash phase. Preferably in both diagnostic and main flash phase a flash is executed which is connected to the load terminal. For this the load terminal is connected to a light source, preferably one or more light emitting diodes.

The flash constitutes an additional load and, if executed in one or both of the two flash phases, the input voltage might drop below the threshold value. During the diagnostic flash phase the first control unit adjusts the adjustable current source such as to comply with the threshold value, i.e. the input voltage is set to be equal or greater than the threshold value. Preferably, the adjusted current at the adjustable current source is re-used in the main flash phase to set the current at the adjustable current source without further adjustments.

The system is evaluated with a cold device during the diagnostic flash phase and system parameters like the load current which can be provided by the adjustable current source given the current battery condition are measured to fit to this condition. During the usually longer main flash phase the device usually heats up and might have to reduce the above-mentioned load current as a function of temperature. Regulating the dc/dc converter to provide the measured voltage drop over the adjustable current source or, in other words, provide the compliance voltage, is advantageous in order to maintain a constant current of the adjustable current source.

According to another aspect of the invention, the first control unit has means to set the adjustable current source to a predetermined value to provide the load current at the load terminal. This usually is done when entering the diagnostic flash phase.

During the diagnostic flash phase the load current is then reduced in steps starting from the predetermined value. Each step corresponds to a load consecutively applied to the flash driver during the diagnostic flash phase. Preferably, all loads which need to be present during the main flash phase are tested during the diagnostic flash phase. This way, the diagnostic flash phase mimics the exact conditions under which the main flash is also operated. By applying the corresponding loads in a consecutive or step-wise fashion, the adjustable current source can be adjusted to a minimum value which guaranties operation in the main flash phase preventing resetting or collapsing the system due to insufficient battery conditions. The so adjusted minimum value is stored into a memory comprised by the first control unit. During the main flash phase this minimum value is read from the memory to set the adjustable current to the minimum value. During the main flash phase no further reduction of current supplied by the adjustable current source is necessary.

As an alternative to the above described consecutive or step-wise approach the loads may also be operated simultaneously.

According to another aspect, the predetermined value is given by a maximum value such that the input voltage is greater than the threshold value. Under certain battery conditions the predetermined value which can be reached is limited to a value at which the input voltage is dropping under the threshold value. Setting the predetermined value to a higher value would probably shut down or reset the whole system. To avoid these conditions the current is only ramped up or set to a maximum value which assures that the battery voltage is not dropping below critical values as characterized by the threshold value. Preferably the threshold value includes some safety margin to indicate critical battery condition in good time.

According to another aspect of the invention, the dc/dc converter is a switching regulator or, preferably, a boost converter. The dc/dc converter comprises switches which are operated according to a duty cycle set by a switching control unit. The duty cycle determines the conversion of the input voltage to the output voltage. Furthermore, the second control unit comprises the switching control unit which is coupled to the switches. The switching control unit is connected via a second input to an error signal generator which is connected to the adjustable current source.

The error signal generator generates an error signal depending on the voltage drop over the adjustable current source. This voltage drop, as described above, is also indicative of the compliance voltage. Depending on the voltage drop, the error signal indicates the switching control unit to adjust the duty cycle of the dc/dc converter so as to provide a constant current at the adjustable current source. This renders the current provided by the adjustable current source largely independent on temperature changes which might occur due to heating of the flash driver.

According to another aspect of the invention, the error signal generator comprises a second comparator which, at a first input, receives the compliance voltage from a setting device connected to the input side of the adjustable current source. At a second input, the comparator is coupled to the output side of the adjustable current source via the load terminal. An output is designed to supply the error signal and is coupled to the switching control unit via the second input.

The setting device supplies the compliance voltage at the second comparator. Alternatively, the second comparator can be an operational amplifier like an operational transconductance amplifier or OTA for short. The setting device can be designed to measure the compliance voltage from the voltage drop over the adjustable current source or receive the compliance voltage from a microcontroller or the like. At the other input of the second comparator the current voltage over the adjustable current source is applied. The second comparator compares this voltage with the compliance voltage. The error signal is a result of this comparison.

The error signal indicates whether the compliance voltage drops over the adjustable current source or not. For example the error signal may be a current depending on a voltage difference applied to the input of the comparator or OTA. It is preferred that the switching control unit receives the error signal and adjusts the duty cycle to control the dc/dc converter. As a result the voltage drop over the adjustable current source is altered so as to achieve a constant current over temperature variations.

According to another aspect of the invention, the setting device comprises a first and second branch, each connected to the first input of the second comparator via a control switch. In particular, the first branch is coupled to the input side of the adjustable current source via a first setting device. The second branch is coupled to the input side of the adjustable source via a second setting device.

The first setting device is designed to derive a minimum compliance voltage from the adjusted minimum value at the adjustable current source. On the other side, the second setting device is designed to derive a temperature-compensated adjusted compliance voltage.

Preferably, during the diagnostic flash phase the temperature-compensated compliance voltage is applied to the second comparator via the control switch. The adjustable current source is adjusted to the minimum value that complies also with the temperature-compensated adjusted compliance voltage. Generally the temperature-compensated adjusted compliance voltage is chosen to be higher than the minimum compliance voltage. As a consequence the minimum value at the adjustable current source is adjusted to a value which is lower as compared to the case if the minimum compliance voltage was used. In other words using the temperature-compensated compliance voltage during the diagnostic flash phase imprints a safety margin onto the adjusted load current to simulate the temperature rise to be expected during the main flash phase. In fact, during the main flash phase the dc/dc converter is set to control the conversion of input voltage to output voltage based on the minimum compliance voltage.

According to another aspect of the invention, the control switch has different switching states in the diagnostic flash phase and the main flash phase. During the diagnostic flash phase the control switch electrically connects the second branch to the first input of the second comparator. During the main flash phase the control switch electrically connects the first branch to the first input of the second comparator.

According to an aspect of the invention, the switching control unit sets an on-resistance of switches of the dc/dc converter. Based on the switches set the dc/dc converter converts the input voltage to the output voltage.

Switching the on-resistance of switches can be used instead or in addition to using the two branches described above. The on-resistance determines the losses in the switches. In either case switching the on-resistance simulates the temperature rise to be expected during the main flash phase.

Switches are set to respective on-resistance such that in the diagnostic flash phase the conversion of the dc/dc converter is according to the minimum compliance voltage. Accordingly, during the main flash phase switches are set to regulate according to the temperature compensated compliance voltage as described above.

According to another aspect of the invention, the switching control unit comprises a third comparator. On its first input the third comparator is connected to a pulse generator and, on its second input, connected via a summer and a filter to the second input. On its output side, the third comparator is connected to a driver designed to operate the switches of the dc/dc converter.

The filtered error signal from the second comparator or, alternatively, from the OTA is compared to an oscillator ramp signal from the pulse generator. The third comparator outputs a digital output, preferably of pulse width modulation type (PWM) that operates the switches of the dc/dc converter. When the circuit output voltage changes, the error signal also changes and thus cause the third comparator threshold to change. Consequently, the output pulse width also changes and, thereby the duty cycle is changed. The change in duty cycle moves the output voltage to reduce the error signal to zero, in a way completing a control loop.

According to an aspect of the invention a method to limit a load current for a flash driver comprises the steps of receiving an input voltage and converting the input voltage to an output voltage using a dc/dc converter. Then, a load current is provided depending on the input voltage and a respective load by using an adjustable current source. The input voltage is then compared to a threshold value and then, if the comparison indicates the input voltage being smaller than the threshold value, the adjustable current source is adjusted until the input current source is equal or greater to the threshold value.

From the so adjusted adjustable current source a voltage drop over the adjustable current source is determined and the dc/dc converter is set to control the converting of the input voltage to the output voltage depending on the determined voltage drop.

An advantage of the above-described method lies in the fact that the output current can be kept constant even under varying temperature conditions. Preferably, the measured voltage drop is used to set the dc/dc converter so as to keep the output current constant. Otherwise the current to be supplied by the load driver may, without the suggested implementations, not be constant and depending on temperature. Temperature changes due to heating of the driver during operation affect the load current. In fact, internal heating of the device can reduce the efficiency of the flash driver. As the flash driver usually is battery driven current cannot be increased due to safety and charge limitation. The flash driver would be forced to reduce its output current as a function of temperature if no further control was implemented.

The method, however, allows for accurate evaluation of battery conditions to provide constant current throughout the operation of the flash driver. Flash quality to be used with the flash driver can be improved as lighting conditions can also be constant during the flash.

According to another aspect the voltage drop is used to derive a compliance voltage and the dc/dc converter is controlled depending on the compliance voltage.

The compliance voltage can be derived from the voltage drop over the adjustable current source and provides a control variable which can be used to assure a constant current be supplied during operation of the flash driver even under changing temperature.

The compliance voltage of the adjustable current source depends on the current set at the adjustable current source. Therefore it has to be measured by detecting the voltage drop over the adjustable current source. The compliance voltage could also be set to an appropriate value. This way temperature depending changes in the adjustable current source are taken into account.

According to another aspect of the invention, the adjustable current source is only adjusted during a diagnostic flash phase. The so adjusted load current is provided during a main flash phase.

According to an aspect of the invention, during a diagnostic flash phase a compensation factor is added to the compliance voltage to yield an adjusted compliance voltage. The compensation factor is used to account for temperature rise of the flash driver during the main flash phase.

By using the compensation factor to define a temperature-compensated adjusted compliance voltage results in a smaller current value set at the adjustable current source. In some sense the temperature-compensated compliance voltage simulates the expected temperature rise during the main flash phase.

In the following, the principle presented above is described in further detail with respect to drawings in which exemplary embodiments are presented.

Figure 2:
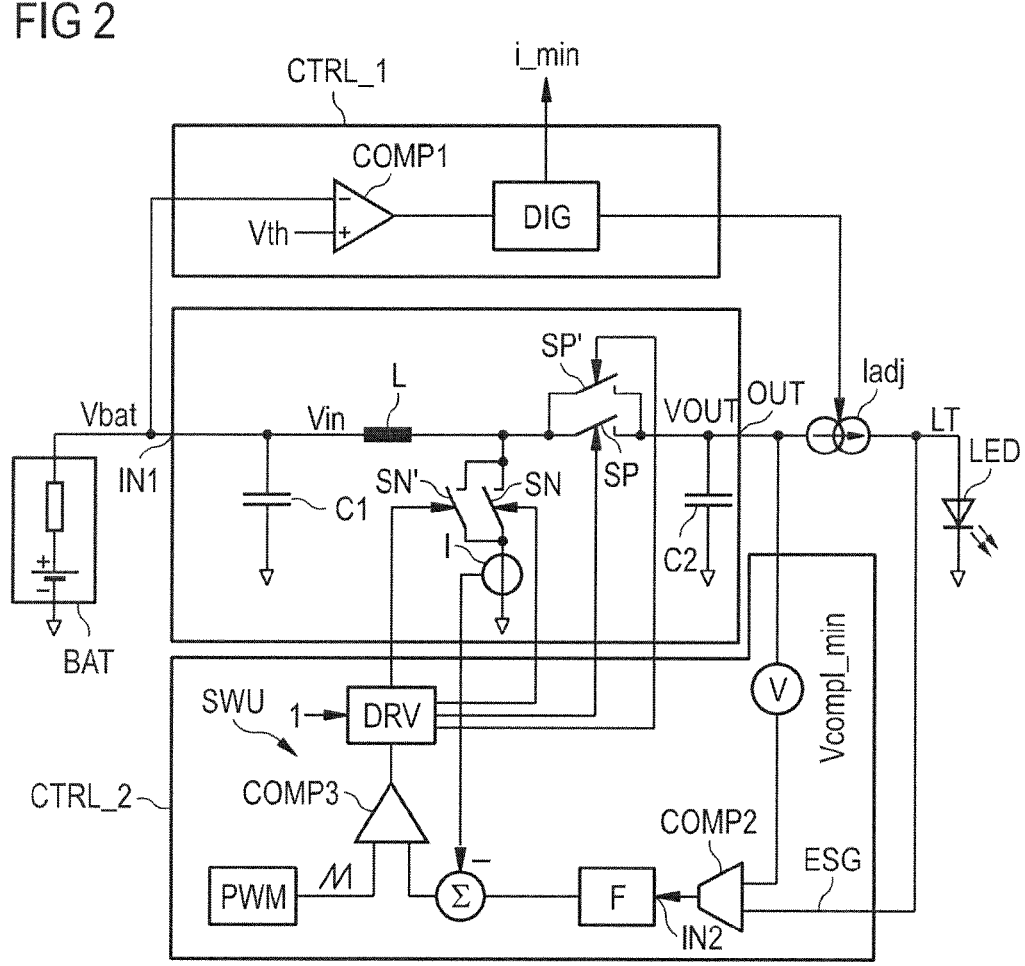
Figure 3C:
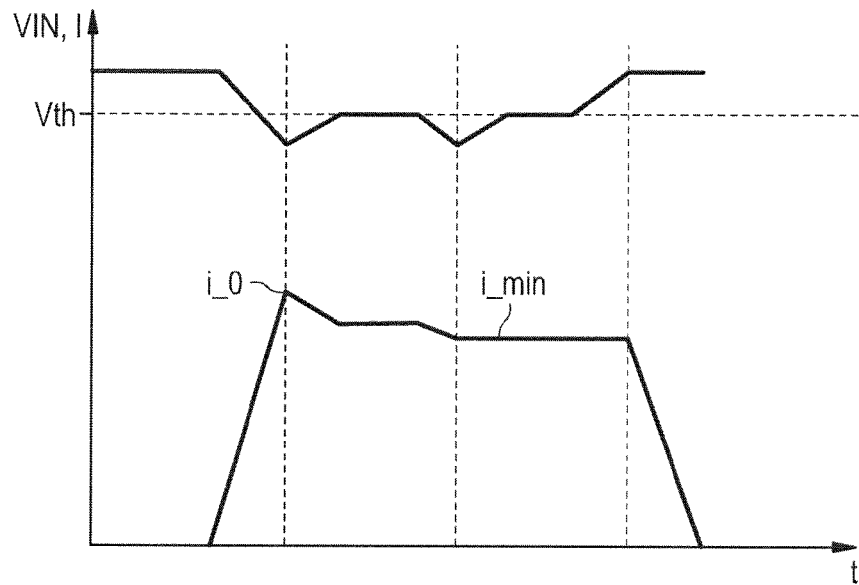
Figure 4:
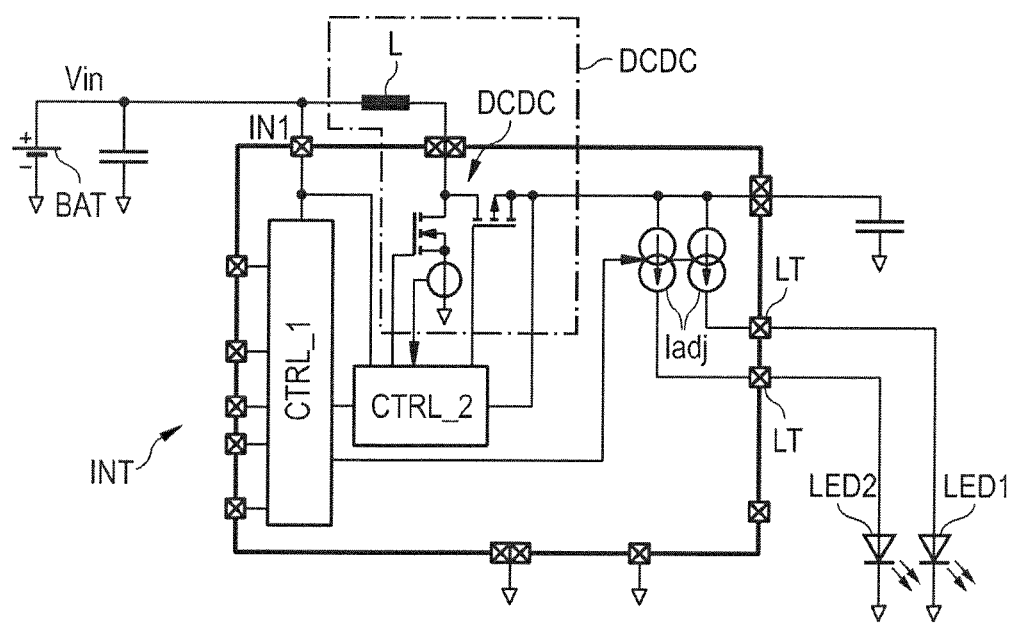

FIG. 1 shows an exemplary embodiment of a flash driver according to the principle presented, FIG. 2 shows another exemplary embodiment of a flash driver according to the principle presented, FIGS. 3A, 3B and 3C show exemplary timing diagrams indicating the diagnostic and main flash according to the principle presented, FIG. 4 shows an exemplary embodiment of an integrated circuit comprising a flash driver according to the principle presented.

FIG. 1 shows an exemplary embodiment of a flash driver according to the principle presented. The flash driver comprises three basic components: a dc/dc converter DCDC, a first control unit CTRL_1 and a second control unit CTRL_2. The flash driver has a first input on its input side to supply an input voltage Vin from a battery BAT. On its output side, the flash driver circuit has a load terminal LT to connect loads such as, for example, a light-emitting diode LED to implement a flash.

Based on the battery voltage Vbat and loads applied to the flash driver and battery BAT, the dc/dc converter DCDC is supplied with the input voltage Vin. The dc/dc converter DCDC converts the input voltage Vin to an output voltage Vout at an output OUT. The dc/dc converter DCDC shown in FIG. 1 is a boost converter of switched type. It is possible, however, to implement other types of converters as well.

The present dc/dc converter DCDC comprises an inductivity L which is connected to the first input IN1. Also connected to the first input IN1 as well as to the inductivity L is a first capacitor C1 coupled to a ground potential. The inductivity L is further connected via a first switch SP to the output terminal OUT of the dc/dc converter DCDC. Connected in between the inductivity L and the output terminal OUT is a second capacitor C2 coupled to ground potential. Coupled in between the inductivity L and the first switch SP is a second switch SN which is connected to ground potential via a current source I.

An adjustable current source Iadj is coupled in between the output terminal OUT of the dc/dc converter and the load terminal LT.

The first control unit CTRL_1 is connected to the first input IN1 via a first comparator COMP1. A second input of comparator COMP1 is supplied with a threshold signal Vth. On its output side the comparator COMP1 is connected with a digital controller DIG. The digital controller DIG is coupled via control lines to the adjustable current source Iadj.

The second control unit CTRL_2 comprises an error signal generator ESG and a switching unit SWU. The error signal generator ESG comprises two measurement branches having setting devices V1, V2. Both of these setting devices V1, V2 are coupled in between the output terminal OUT and an input side of the adjustable current source Iadj. A control switch S1 is designed to either electrically connect the first or the second branch to a first input of a second comparator COMP2. The second comparator COMP2, in this example, is an operational transconductance amplifier or OTA. A second input of the second comparator COMP2 is connected to an output side of the adjustable current source Iadj via the load terminal LT. An output of the second comparator COMP2 is coupled to the switching unit SWU via an input IN2.

The switching control unit SWU comprises two branches each of which are connected to the input side of a third comparator COMP3. The first branch connects a pulse generator PWM with the first input of the third comparator COMP3. The second branch is coupled to the input IN2 via a summer Σ and a filter F. The third comparator COMP3 has an output connected to a driver circuit DRV which is connected via control lines to the first and second switch SP, SN and the current source I.

FIG. 2 shows another exemplary embodiment of a flash driver circuit according to the principle presented. The flash driver circuit presented here is based on a design similar to that already shown in FIG. 1 so only different components will be discussed here.

The error signal generator ESG only comprises only a single setting device V. On the other side, parallel to the first and second switch SP, SN are auxiliary switches SP', SN'. These switches are also connected to the driver circuit DRV via respective control lines.

The details of operation of the presented flash driver circuits are explained in further detail with respect to FIGS. 3A to 3C.

FIG. 3A shows an exemplary timing diagram during operation of the flash driver circuit according to the principle presented. Shown in this diagram are the input voltage Vin and load current I at the adjustable current source Iadj as a function of time. The flash driver circuit is preferably operated in at least two distinct phases. A diagnostic flash phase 1 is used to evaluate the driver system and set parameters accordingly to be used during a main flash phase 2.

The first control unit CTRL_1 monitors the input voltage Vin at the first input IN1. The diagram of FIG. 3A shows an exemplary phase 0 to illustrate how the input voltage Vin drops due to a certain load applied to the flash driver or battery BAT. An example for such loads is a RF module in a mobile phone which is activated if a call is received or sent or during autofocus (AF) operation using the flash LED as light support. Within safety margins the battery BAT provides the current needed to maintain the functionality of the device. If the user decides to use a flash together with a camera processor present in the device the battery BAT needs to support a corresponding high power load. To assure that the battery BAT is able to provide such load current the condition is tested in the diagnostic flash phase 1.

In this phase, all necessary loads are applied to evaluate how the input voltage Vin is stressed and detect whether any critical condition can occur. If such critical state is to be expected the device comprises appropriate means to indicate that a flash is not possible or even initiate safety shutdown. Loads comprise the flash itself, i.e. the light-emitting diode LED, and subsystems like the RF module, camera processor, display backlight, and application processor.

Under normal conditions, however, the flash driver adjusts the load current to fit to the given battery state. This is achieved by comparing the input voltage Vin to a threshold value Vth at the first comparator COMP1 of the first control unit CTRL_1 during the diagnostic flash phase. In this exemplary embodiments (see FIGS. 1 and 2) all loads are consecutively applied to the driver in steps one after the other (see FIG. 3C for details).

The first control unit CTRL_1 adjusts the adjustable current source Iadj to comply with the given input voltage Vin, i.e. the input voltage is set equal or greater than the threshold value Vth. This is done by the digital controller DIG. The so adjusted current at the adjustable current source Iadj is called a minimum value i_min hereinafter. The minimum value i_min is stored in a memory comprised by the digital controller DIG for later use in the main flash phase 2. Alternatively, the minimum value i_min can also be sent through an interface INT (see FIG. 4). During the main flash phase 2 no further adjustments to the adjustable current source are performed.

The adjustable current source Iadj has a characteristic compliance voltage which defines the minimum voltage needed to provide a given current. The compliance voltage corresponding to the minimum value i_min is called the minimum compliance voltage Vcompl_min hereinafter. Compliance voltages are employed by both flash drivers circuits of FIGS. 1 and 2 to render the load current provided by the adjustable current source constant Iadj over temperature variations.

The second control unit CTRL_2 is used to alter the conversion of input voltage to output voltage. This is done by setting the duty cycle of the dc/dc converter DCDC based on the error signal. First, the error signal generator ESG generates the error signal at the second input IN2 of the switching unit SWU. Second, the switching unit sets the duty cycle of the dc/dc converter DCDC according to the error signal.

In FIG. 1 the control switch S1 either connects the first setting device V1 or second setting device V2 with the second comparator COMP2. In this embodiment the control switch S1 is set to connect the first setting device V1 with the second comparator COMP2 during the main flash phase 2 and second setting device V2 during the diagnostic flash phase 1. Setting the control switch S1 can be initiated via appropriate means in the first control unit CTRL_1 (like the digital controller DIG) or via an interface INT (see FIG. 4). The first setting V1 is designed to supply the second comparator COMP2 with the minimum compliance voltage Vcompl_min. The second setting V2 is designed to supply the second comparator COMP2 with an adjusted compliance voltage Vcompl_adj. The adjusted compliance voltage Vcompl_adj is based on the minimum compliance voltage Vcompl_min but a temperature-dependent or fixed compensation factor is added. For example typical minimum compliance voltage is around 100 mV, and then a typical adjusted compliance voltage is around 300 mV.

In FIG. 2 only one setting device V is present which is designed to supply the second comparator COMP2 with the minimum compliance voltage Vcompl_min. During the diagnostic flash phase 1, however, the minimum compliance voltage Vcompl_min of the adjustable current source Iadj is increased up to an adjusted compliance voltage Vcompl_adj using the switchable on-resistance of switches SP, SP', SN, SN'. During the diagnostic flash phase 1 only switches SP, SN are used whereas during the main flash phase 2 all switches SP, SP', SN, SN' are used. Preferably switches are transistors and switching on-resistance increases losses in the switching transistors. As a result during the diagnostic flash phase 1 a higher input current is required for the same output power as the efficiency is reduced during the diagnostic flash phase 1. Transistors are chosen such that the on-resistance accounts for a temperature-rise dependent compensation factor which effectively is added to yield the adjusted compliance voltage Vcompl_adj from the minimum compliance voltage Vcompl_min.

The error signal from the second comparator COMP2 is filtered and compared to an oscillator ramp signal from the pulse generator PWM. The third comparator COMP3 outputs a digital output, preferably of pulse width modulation type (PWM) that operates the switches of the dc/dc converter DCDC. When the circuit output voltage changes, the error signal also changes and thus cause the third comparator COMP3 threshold to change. Consequently, the output pulse width also changes. This duty cycle change then moves the output voltage OUT to reduce to error signal to zero, in a way completing a control loop.

In effect in both embodiments of FIGS. 1 and 2 the dc/dc converter DCDC is controlled such that the higher adjusted compliance voltage Vcompl_adj drops across the adjustable current source Iadj as the efficiency is reduced during the diagnostic flash phase 1. Therefore the reduced efficiency of the flash circuit during the main flash phase 2 due to temperature rise is taken into account by operating the dc/dc converter DCDC with adjusted compliance voltage Vcompl_adj already during the diagnostic flash phase 1. In some sense during the diagnostic flash phase 1 a heated up flash driver is simulated even though the device is still colder. Parameters like the minimum value i_min at the adjustable current source are set accordingly. Both concepts presented in FIGS. 1 and 2 may be combined or used as alternatives.

FIG. 3B shows another timing sequence during operation of a flash driver according to the principle presented. This diagram shows how the adjusted minimum current value i_min changes as a function of temperature. This corresponds to the condition where no control of duty cycle based on the compliance voltage is present. During the main flash phase 2 the load current is no longer constant due to the heating of the device. The internal heating of the device reduces the efficiency of the flash driver. During the diagnostic phase 1 the system is evaluated with a cold device and the load current is measured to fit to this condition. During the longer main flash phase 2, the device heats up and its output current has to be reduced as the battery current cannot be increased.

FIG. 3C shows an exemplary timing diagram showing the reduction of current at the adjustable current source Iadj. The diagnostic flash phase 1 is initiated by setting or ramping the load current I to a predetermined value i_0. The predetermined value i_0 is given by a maximum value i_max such that the input voltage is greater than the threshold value Vth. Under certain battery conditions the predetermined value i_0 which can be reached is limited to a value at which the input voltage is dropping under the threshold value. Setting the predetermined value to a higher value would probably shut down or reset the whole system. To avoid these conditions the current is only ramped up or set to a maximum value which assures that the battery voltage is not dropping below critical values as characterized by the threshold value. Preferably the threshold value includes some safety margin to indicate critical battery condition in good time.

During the diagnostic flash phase 1 the load current is then reduced in steps starting from the predetermined value i_0. Each step corresponds to a load consecutively applied to the flash driver during the diagnostic flash phase. Preferably, all loads which need to be present during the main flash phase 2 are tested during the diagnostic flash phase 1. This way, the diagnostic flash phase mimics the exact conditions under which the main flash is also operated. By applying the corresponding loads in a consecutive or step-wise fashion, the adjustable current source can be reduced to the minimum value which guaranties operation in the main flash phase 2 preventing resetting or collapsing the system due to insufficient battery conditions. The so adjusted minimum value i_min is stored into a memory comprised by the first control unit or can be transferred through the interface INT (see FIG. 4). During the main flash phase this minimum value 2 is read from the memory to set the adjustable current Iadj to the minimum value i_min. During the main flash phase 2 no further reduction of current supplied by the adjustable current source Iadj is necessary.

FIG. 4 shows an exemplary implementation of the flash driver in an integrated circuit according to the principle presented. Please note that this figure only shows some components needed in the context of this description. It should be noted, however, that all necessary components of the flash driver as discussed above are also present in the integrated circuit.

An interface INT receives data signals which indicate the flash driver t either enter the diagnostic flash phase 1 or main flash phase 2. Corresponding data signals can be provided by a camera processor or application/baseband processor. Preferably communication via the interface is bidirectional and at the interface INT the adjusted minimum value i_min is supplied. This way the camera processor or any other appropriate means can evaluate the minimum value i_min to adjust a gain of the camera if necessary.

REFERENCE NUMERALS 0 exemplary phase
1 diagnostic flash phase
2 main flash phase
BAT battery
C1 capacitor
C2 capacitor
COMP1 comparator
COMP2 comparator
COMP3 comparator
CTRL_1 first control unit
CTRL_2 second control unit
DIG digital controller
DRV driver
ESG error signal generator
F filter
I load current
i_0 predetermined current value
Iadj adjustable current source
i_min minimum current value
IN1 input
IN2 input
INT interface
L inductivity
LED light emitting diode
LED1 light emitting diode
LED2 light emitting diode
LT load terminal
OUT output
PWM pulse generator
Σ summer
S1 control switch
SP switch
SP' switch
SN switch
SN' switch
SWU switching control unit
V setting device
V1 setting device
V2 setting device
Vbat battery voltage
Vcompl_adj adjusted compliance voltage
Vcompl_min minimum compliance voltage
Vin input voltage
Vout output voltage
Vth threshold value

The invention claimed is:

1. A flash driver to limit a load current for a flash comprising:
 a dc/dc converter having a first input to receive an input voltage and an output to supply an output voltage, and being designed to convert the input voltage to the output voltage;
 an adjustable current source connected between the output and a load terminal;
 a first control unit connected to the first input and coupled to the adjustable current source, and being designed to compare the input voltage to a threshold and, if the comparison indicates the input voltage being smaller than the threshold value, adjust the adjustable current source such that the input voltage is equal or greater than the threshold value; and
 a second control unit coupled to the adjustable current source and the dc/dc converter to detect a voltage drop over the adjustable current source and to set the dc/dc converter to control the conversion of input voltage to the output voltage depending on the detected voltage drop.

2. The flash driver according to claim 1, wherein the second control unit has means to determine from the detected voltage drop a compliance voltage of the adjustable current source.

3. The flash driver according to claim 1 or 2, wherein the first control unit comprises:
 a comparator connected, on its input side, with the first input and a reference input to apply the threshold, and, on its output side, connected to a controller; and
 the controller coupled to the adjustable current source.

4. The flash driver according to claim 1, wherein the first control unit comprises an interface to receive data signals indicating the flash driver to enter a diagnostic flash phase or a main flash phase.

5. The flash driver according to claim 4, wherein the first control unit has means to set the adjustable current source to a predetermined value to provide a load current at the load terminal such that, in the diagnostic flash phase, the load current is reduced in steps, each step corresponding to a load consecutively applied to the flash driver, starting from the predetermined value and a so adjusted minimum value is saved into a memory and, in the main flash phase, read the minimum value from the memory to set the adjustable current source to the minimum value.

6. The flash driver according to claim 5, wherein the predetermined value is given by a maximum value such that the input voltage is greater than the threshold.

7. The flash driver according to claim 1, wherein the dc/dc converter is a switching regulator, in particular a boost converter, comprising switches, wherein the switches are operated according to a duty cycle which determines the conversion of the input voltage to the output voltage; and
 wherein the second control unit comprises a switching control unit coupled to switches and connected, at a second input, to an error signal generator which is connected to the adjustable current source, and being designed to set the duty cycle depending on an error signal of the error signal generator depending on the voltage drop over the adjustable current source.

8. The flash driver according to claim 7, wherein the error signal generator comprises a second comparator which:
 at a first input, receives the compliance voltage from a setting device connected to the input side of the adjustable current source;
 at a second input, is coupled to the output side of the adjustable current source via the load terminal; and
 at an output to supply the error signal, is coupled to the switching control unit via the second input.

9. The flash driver according to claim 8, wherein the setting device comprises a first and second branch each connected to the first input of the second comparator via a control switch,
 wherein the first branch is coupled to the input side of the adjustable current source via a first setting device to derive from the adjusted minimum value at the adjustable current source a minimum compliance voltage, and
 wherein the second branch is coupled to the input side of the adjustable current source via a second setting device to derive a temperature compensated compliance voltage.

10. The flash driver according to claim 9, wherein the control switch in the diagnostic flash phase electrically connects the second branch to the first input of the second comparator, and
   wherein the control switch in the main flash phase electrically connects the first branch to the first input of the second comparator.

11. The flash driver according to claim 9 or 10, wherein the switching control unit sets an on-resistance of switches of the dc/dc converter such that the dc/dc converter converts the input voltage to the output voltage, in the diagnostic flash phase, according to the minimum compliance voltage, and in the main flash phase, according to the temperature compensated compliance voltage.

12. The flash driver according to claim 7, wherein the switching control unit comprises a third comparator which:
   on its first input, is connected to a pulse generator;
   on its second input, is connected via a summer and a filter to the second input; and
   on its output, is connected to a driver designed to operate the switches of the dc/dc converter.

13. A method to limit a load current for a flash driver, comprising the steps of:
   receiving an input voltage;
   converting the input voltage to an output voltage using a dc/dc converter;
   providing a load current depending on the input voltage and a respective load by using an adjustable current source;
   comparing the input voltage to a threshold value and, if the comparison indicates the input voltage being smaller than the threshold value adjust the adjustable current source until the input voltage is equal or greater than the threshold value;
   and determining from the so adjusted adjustable current source a voltage drop over the adjustable current source and set the dc/dc converter to control the converting of the input voltage to the output voltage depending on the determined voltage drop.

14. The method of claim 13, wherein from the voltage drop a compliance voltage is derived and the dc/dc converter is controlled depending on the compliance voltage.

15. The method of claim 14, wherein the adjustable current source is only adjusted during a diagnostic flash phase and provide the so adjusted load current during a main flash phase.

16. The method according to claim 15, wherein during the diagnostic flash phase, a compensation factor is added to the compliance voltage to account for temperature rise of the flash driver during the main flash phase.

* * * * *